United States Patent
Toyoshima (10) Patent No.: US 11,422,949 B2
(45) Date of Patent: Aug. 23, 2022

(54) COMMUNICATION DEVICE

(71) Applicant: Sony Group Corporation, Tokyo (JP)

(72) Inventor: Akihiko Toyoshima, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/288,633

(22) PCT Filed: Nov. 8, 2018

(86) PCT No.: PCT/JP2018/041501
§ 371 (c)(1),
(2) Date: Apr. 26, 2021

(87) PCT Pub. No.: WO2020/095410
PCT Pub. Date: May 14, 2020

(65) Prior Publication Data
US 2021/0397564 A1   Dec. 23, 2021

(51) Int. Cl.
*G06F 12/14* (2006.01)

(52) U.S. Cl.
CPC ...... *G06F 12/1441* (2013.01); *G06F 12/1458* (2013.01)

(58) Field of Classification Search
CPC ....... G06F 2221/2141; G06F 2221/121; G06F 2212/2141; G06F 2212/21; G06F 21/70; G06F 21/78; G06F 12/14–1491; G06F 3/062–0623
See application file for complete search history.

(56) References Cited

U.S. PATENT DOCUMENTS

2009/0210644 A1* 8/2009 Batifoulier .......... G06F 12/1441
  711/E12.091
2014/0123320 A1* 5/2014 Isozaki ................. G06F 21/74
  726/29

(Continued)

FOREIGN PATENT DOCUMENTS

JP   2004-280801 A   10/2004
JP   2008-48210 A    2/2008

(Continued)

OTHER PUBLICATIONS

L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69. (Year: 2008).*

(Continued)

*Primary Examiner* — Khoa D Doan
(74) *Attorney, Agent, or Firm* — Xsensus LLP (57) ABSTRACT

It is desired to provide a technology that suppresses the possibility of unauthorized use of an electronic device.
Provided is a communication device that includes a communication unit configured to transmit/receive data, and a storage unit that includes a first area and a second area different from the first area, and in the communication device, the first area is an area in which reading and writing from a program in the second area is prohibited, and the first area stores both of a communication program configured to control the transmission/reception and destination information of the data.

14 Claims, 8 Drawing Sheets

(56) References Cited

U.S. PATENT DOCUMENTS

| | | | |
|---|---|---|---|
| 2015/0082053 A1* | 3/2015 | Sano | G06F 12/1408 |
| | | | 713/193 |
| 2017/0371808 A1* | 12/2017 | Shaw | G06F 12/1466 |
| 2020/0014669 A1* | 1/2020 | Lawson | H04W 12/08 |

FOREIGN PATENT DOCUMENTS

| JP | 2012-181611 A | 9/2012 |
|---|---|---|
| JP | 2015-525916 A | 9/2015 |
| JP | 2018-84854 A | 5/2018 |

OTHER PUBLICATIONS

International Search Report and Written Opinion dated Jan. 29, 2019, received for PCT Application No. PCT/JP2018/041501, Filed on Nov. 8, 2018, 9 pages including English Translation.

* cited by examiner

COMMUNICATION DEVICE

CROSS-REFERENCE TO RELATED APPLICATION

The present application is based on PCT filing PCT/JP2018/041501, filed Nov. 8, 2018, the entire contents of which are incorporated herein by reference.

FIELD

The present disclosure relates to a communication device.

BACKGROUND

There is a technology of installing an electronic device that includes a built-in sensor or the like having a function of collecting data, at a desired place, and periodically (manually) collecting data collected by the electronic device. For efficient collection of collected data, a technology has been put to practical use, for adding a communication function to the Internet, to an electronic device and automatically collecting data collected from a large number of the electronic devices via the Internet (e.g., see Patent Literature 1). Furthermore, it has also been attempted to mount the electronic devices having these communication functions on mobile objects, such as cars, to cause the electronic devices to collect data at various places during movement of the electronic devices.

However, such an electronic device connected to the Internet allows unauthorized entry by a malicious third party into the electronic device via the Internet, and a program in a storage area in the electronic device may be rewritten and executed by the third party in an unauthorized manner. This may cause social harm, for example, the electronic device is made uncontrollable permanently and thereby unnecessary communication traffic is increased due to the electronic device. In addition, the electronic device might be used maliciously.

CITATION LIST

Patent Literature

Patent Literature 1: JP 2018-84854 A

SUMMARY

Technical Problem

Therefore, it is desired to provide a technology that suppresses the possibility of unauthorized use of an electronic device.

Solution to Problem

According to the present disclosure, a communication device is provided that includes: a communication unit configured to transmit/receive data; and a storage unit that includes a first area and a second area different from the first area, wherein the first area is an area in which reading and writing from a program in the second area is prohibited, and the first area stores both of a communication program configured to control the transmission/reception and destination information of the data.

DESCRIPTION OF EMBODIMENTS

Preferred embodiments of the present disclosure will be described in detail below with reference to the accompanying drawings. Note that in the present specification and the drawings, component elements having substantially the same functional configurations are denoted by the same reference symbols and numerals, and redundant descriptions will be omitted.

Note that description will be given in the following order.
0. Overview
1. First Embodiment
1.1. System configuration example
1.2. Exemplary functional configuration of communication device
1.3. Exemplary functional configuration of server device
1.4. Detailed functions of communication device
2. Second Embodiment
2.1. System configuration example
2.2. Detailed functions of communication device
3. Conclusion

0. OVERVIEW

Figure 1:
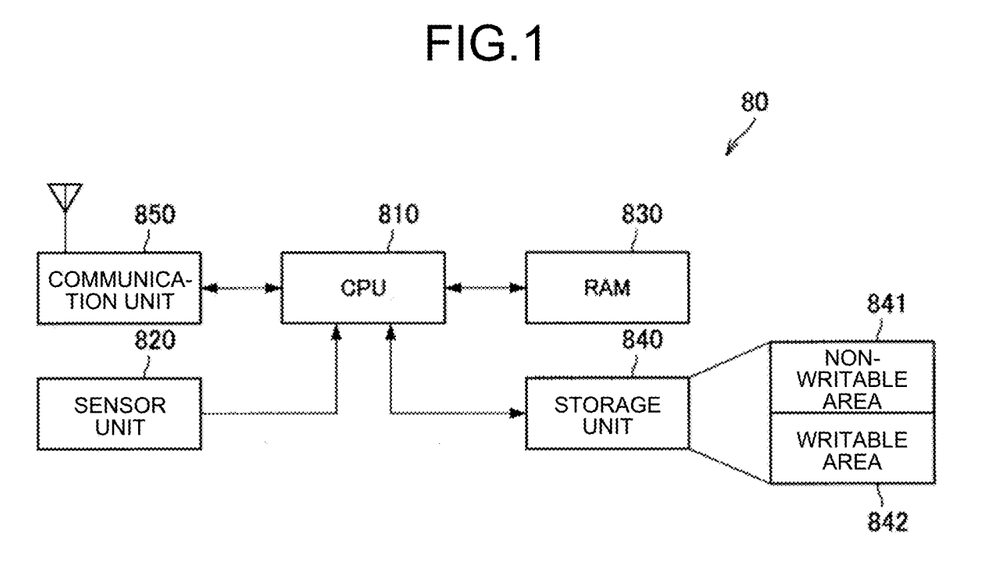
FIG. 1 is a diagram illustrating a configuration example of a general communication device.

First, the outline of the embodiments of the present disclosure will be described. In the embodiments of the present disclosure, a technology for suppressing a possibility of unauthorized use of a communication device as an example of an electronic device will be mainly described. Here, before the communication device according to the embodiments of the present disclosure is specifically described, a general communication device that can be compared with the communication device according to the embodiments of the present disclosure will be described. FIG. 1 is a diagram illustrating a configuration example of the general communication device. In FIG. 1, a configuration example of a general communication device 80 is illustrated. The communication device 80 includes a central processing unit (CPU) 810, a sensor unit 820, a random access memory (RAM) 830, a storage unit 840, and a communication unit 850.

The storage unit 840 includes a non-writable area 841 and a writable area 842. The non-writable area 841 corresponds to a storage area in which data once recorded is prevented from being physically rewritten from the beginning (or a storage area in which the data once recorded is set not to be physically rewritten). The non-writable area 841 is also a so-called "read-only section". Meanwhile, the writable area 842 corresponds to a storage area in which data is configured to be physically rewritten. For example, the storage unit 840 includes a non-volatile memory and is configured to store a program executed by the CPU 810.

In such a configuration, in order to prevent a program from being rewritten and executed in an unauthorized manner, it is assumed that the program is stored and executed in the non-writable area 841. However, when the program is stored in the non-writable area 841, the program stored in the non-writable area 841 cannot be updated by an update program for bug fixing or adding a function, even if the update program is transmitted to the communication device 80 from outside. In such an inappropriate state, as the function of the communication device 80 is complicated, it has been desired to provide a method of transmitting an update program to the communication device 80 from outside and updating a program stored in the storage unit 840 with the update program.

The outline of the embodiments of the present disclosure has been described above.

1. FIRST EMBODIMENT

First, a first embodiment of the present disclosure will be described.

<1.1. System Configuration Example>

Figure 2:
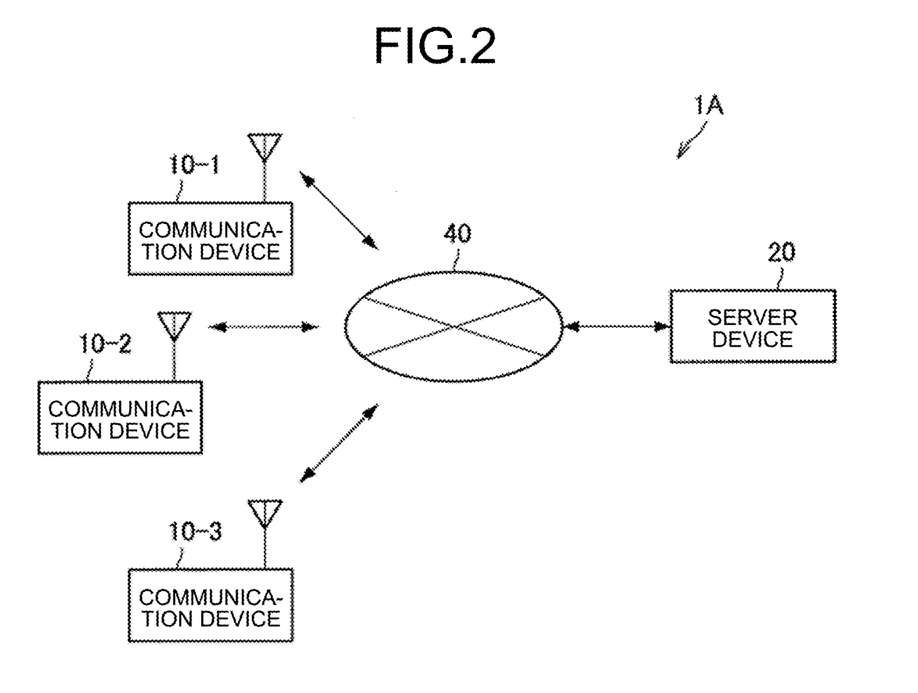
FIG. 2 is a diagram illustrating a configuration example of a communication system according to a first embodiment of the present disclosure.

A configuration example of a communication system according to the first embodiment of the present disclosure will be described with reference to FIG. 2. FIG. 2 is a diagram illustrating a configuration example of the communication system according to the first embodiment of the present disclosure. As illustrated in FIG. 2, a communication system 1A according to the first embodiment of the present disclosure includes communication devices 10-1 to 10-3, a server device 20, and a network 40. For example, the network 40 includes the Internet. The communication devices 10-1 to 10-3 and the server device 20 are configured to communicate with each other via the network 40. Specifically, each of the communication devices 10-1 to 10-3 has a sensor, and data obtained by the sensor is configured to be transmitted to the server device 20 via the network 40.

Each of the communication devices 10-1 to 10-3 and server device may be connected to the network 40 in any manner. For example, the communication devices 10-1 to 10-3 are connected to a backbone network in a wireless manner and connected to the network 40 via the backbone network. The communication devices 10-1 to 10-3 may be directly connected to the backbone network, or may be directly connected to a gateway by using short-range wireless communication and then connected to the backbone network via the gateway. The server device 20 is typically connected to the network 40 in a wired manner but may be connected to the network 40 in a wireless manner.

Furthermore, places where the communication devices 10-1 to 10-3 are provided are also not limited. For example, each of the communication devices 10-1 to 10-3 may be installed on a mobile object (e.g., a vehicle, aircraft, drone, etc.) or may be fixed to a non-mobile object (e.g., near a road, in a house, in a public facility, etc.). Note that in the example illustrated in FIG. 2, the number of the communication devices 10 is three. However, the number of the communication devices 10 is not limited.

The configuration example of the communication system 1A according to the first embodiment of the present disclosure has been described above.

<1.2. Exemplary Functional Configuration of Communication Device>

Figure 3:
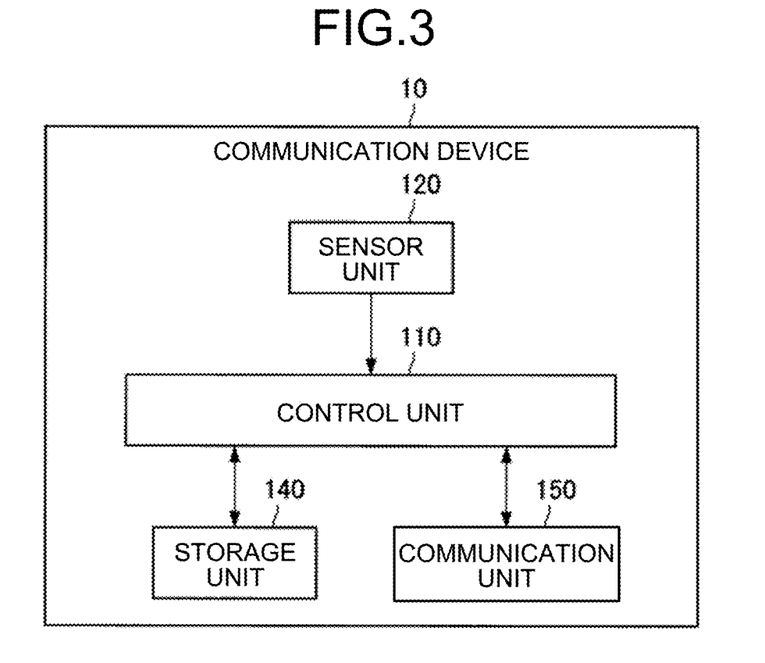
FIG. 3 is a diagram illustrating an exemplary functional configuration of a communication device according to the first embodiment.

Next, an exemplary functional configuration of the communication device 10 according to the first embodiment of the present disclosure will be described. FIG. 3 is a diagram illustrating the exemplary functional configuration of the communication device 10 according to the first embodiment of the present disclosure. As illustrated in FIG. 3, the communication device 10 includes a control unit 110, a sensor unit 120, a storage unit 140, and a communication unit 150.

The control unit 110 controls each unit of the communication device 10. The control unit 110 may include, for example, one or more central processing units (CPUs). In a case where the control unit 110 includes a processing device such as a CPU, the processing device may include an electronic circuit. The control unit 110 is configured to be achieved by executing a program by a processing device having such a configuration.

The sensor unit 120 includes a sensor and detects data by the sensor. The type of the sensor is not limited. For example, the sensor may include an image sensor configured to detect image data, may include a microphone configured to detect audio data, or may include a sensor different from the image sensor or microphone. Data detected by the sensor unit 120 is provided to the control unit 110.

The storage unit 140 is a recording medium that includes a memory (i.e., non-volatile memory) and is configured to store a program executed by the control unit 110 or data necessary for executing the program. Furthermore, the storage unit 140 temporarily stores data for calculation by the control unit 110. The storage unit 140 includes a magnetic storage device, a semiconductor storage device, an optical storage device, a magneto-optical storage device, or the like.

The communication unit 150 includes a communication circuit and has a function of transmitting data to the server device 20 via the network 40, in accordance with the control by the control unit 110. Furthermore, the communication unit 150 has a function of receiving data from the server device 20 connected to the network 40 via the network 40, in accordance with the control by the control unit 110. As described above, the communication unit 150 may be connected to the network 40 in any manner.

The exemplary functional configuration of the communication device 10 according to the first embodiment of the present disclosure has been described above.

<1.3. Exemplary Functional Configuration of Server Device>

Figure 4:
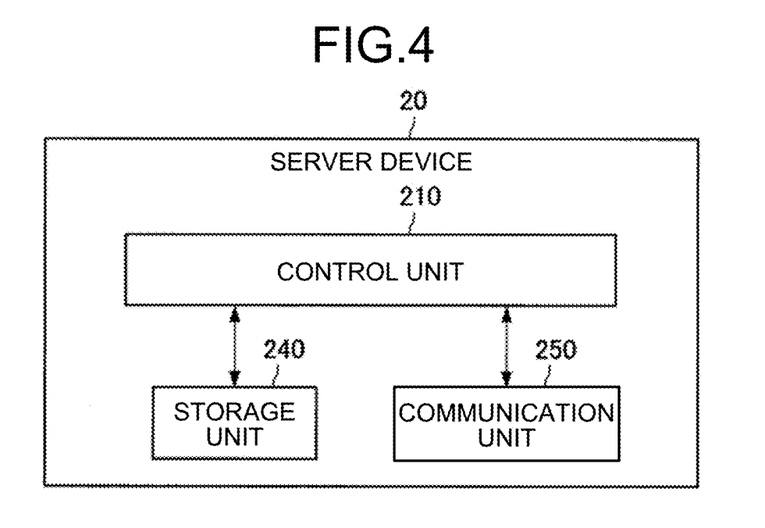
FIG. 4 is a diagram illustrating an exemplary functional configuration of a server device according to the first embodiment.

Next, an exemplary functional configuration of the server device 20 according to the first embodiment of the present disclosure will be described. FIG. 4 is a diagram illustrating the exemplary functional configuration of the server device 20 according to the first embodiment of the present disclosure. As illustrated in FIG. 4, the server device 20 includes a control unit 210, a storage unit 240, and a communication unit 250.

The control unit 210 controls each unit of the server device 20. The control unit 210 may include, for example, one or more central processing units (CPUs). When the control unit 210 includes a processing device such as a CPU, the processing device may include an electronic circuit. The control unit 210 is configured to be achieved by executing a program by a processing device having such a configuration.

The storage unit 240 is a recording medium that includes a memory and is configured to store a program executed by the control unit 210 or data necessary for executing the program. Furthermore, the storage unit 240 temporarily stores data for calculation by the control unit 210. The storage unit 240 includes a magnetic storage device, a semiconductor storage device, an optical storage device, a magneto-optical storage device, or the like.

The communication unit 250 includes a communication circuit and has a function of receiving data from the communication device 10 connected to the network 40 via the network 40, in accordance with control by the control unit 210. Furthermore, the communication unit 250 has a function of transmitting data to the communication device 10 via the network 40. As described above, the communication unit 250 may be connected to the network 40 in any manner.

The exemplary functional configuration of the server device 20 according to the first embodiment of the present disclosure has been described above.

<1.4. Detailed Functions of Communication Device>

Next, detailed functions of the communication device 10 according to the first embodiment of the present disclosure will be described. As described with reference to FIG. 1, when a program is stored in the non-writable area 841, the program stored in the non-writable area 841 cannot be updated by an update program. In such an inappropriate state, as the function of the communication device 80 is complicated, it has been desired to provide a method of transmitting an update program to the communication device 80 from outside and updating a program stored in the storage unit 840 of the communication device 80 with the update program.

In view of this situation, in the first embodiment of the present disclosure, as operation modes of the control unit 110, a first mode (hereinafter, also referred to as "privileged mode") and a second mode (hereinafter, also referred to as "general mode") are provided. In the first mode, data reading (hereinafter, also simply referred to as "reading") and data writing (excluding data writing into a non-writable area, and hereinafter, also simply referred to as "writing") are permitted for all storage area, and in the second mode, both of reading and writing are not permitted for predetermined area in the storage area. The storage area includes the storage unit 140 and a calculation memory (system control register group for hardware control, etc.). The control unit 110 is configured to be alternately applied to these modes according to the specific procedure prepared in advance.

Figure 5:
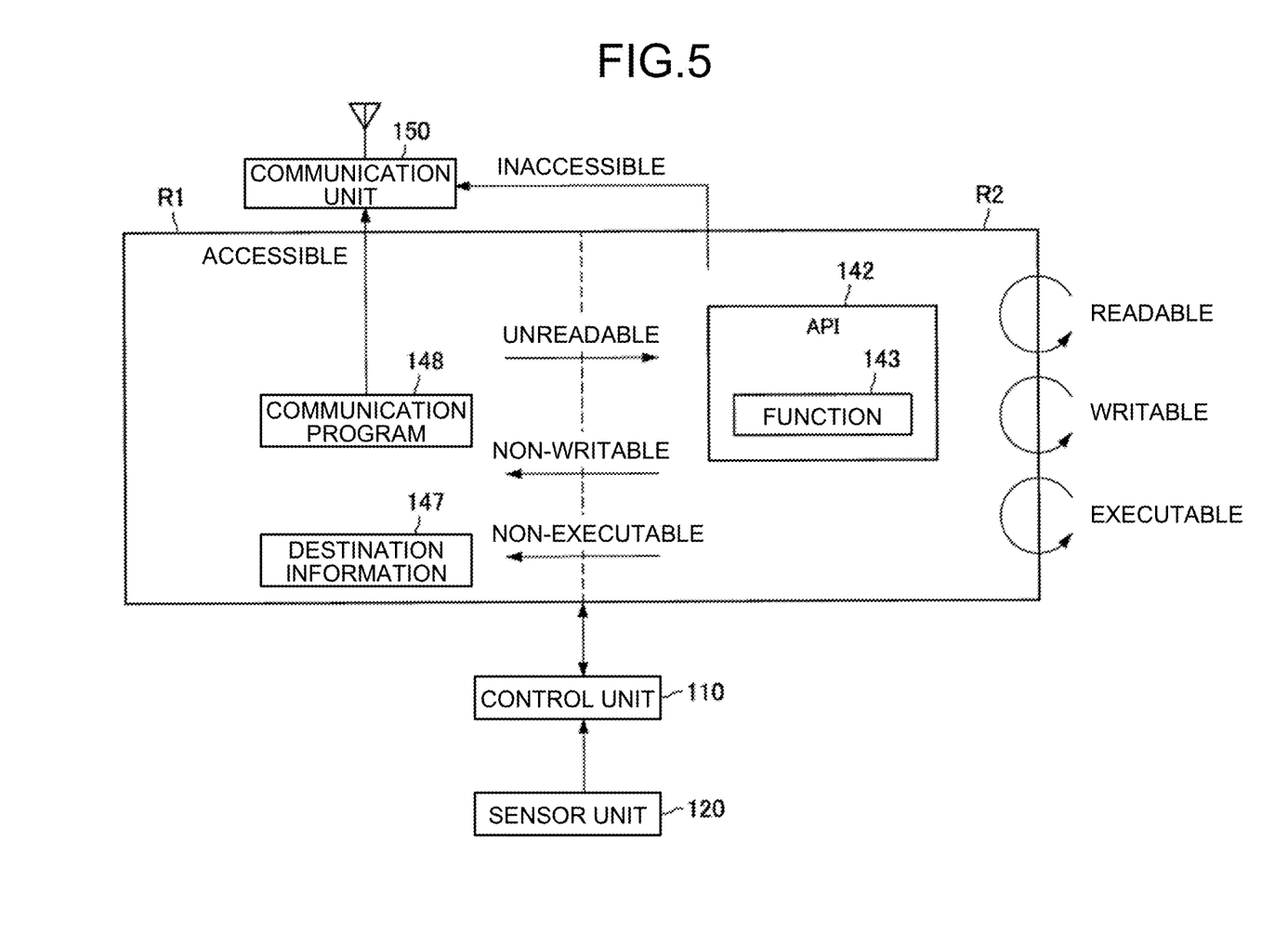
FIG. 5 is a diagram illustrating detailed functions of the communication device according to the first embodiment.
Figure 6:
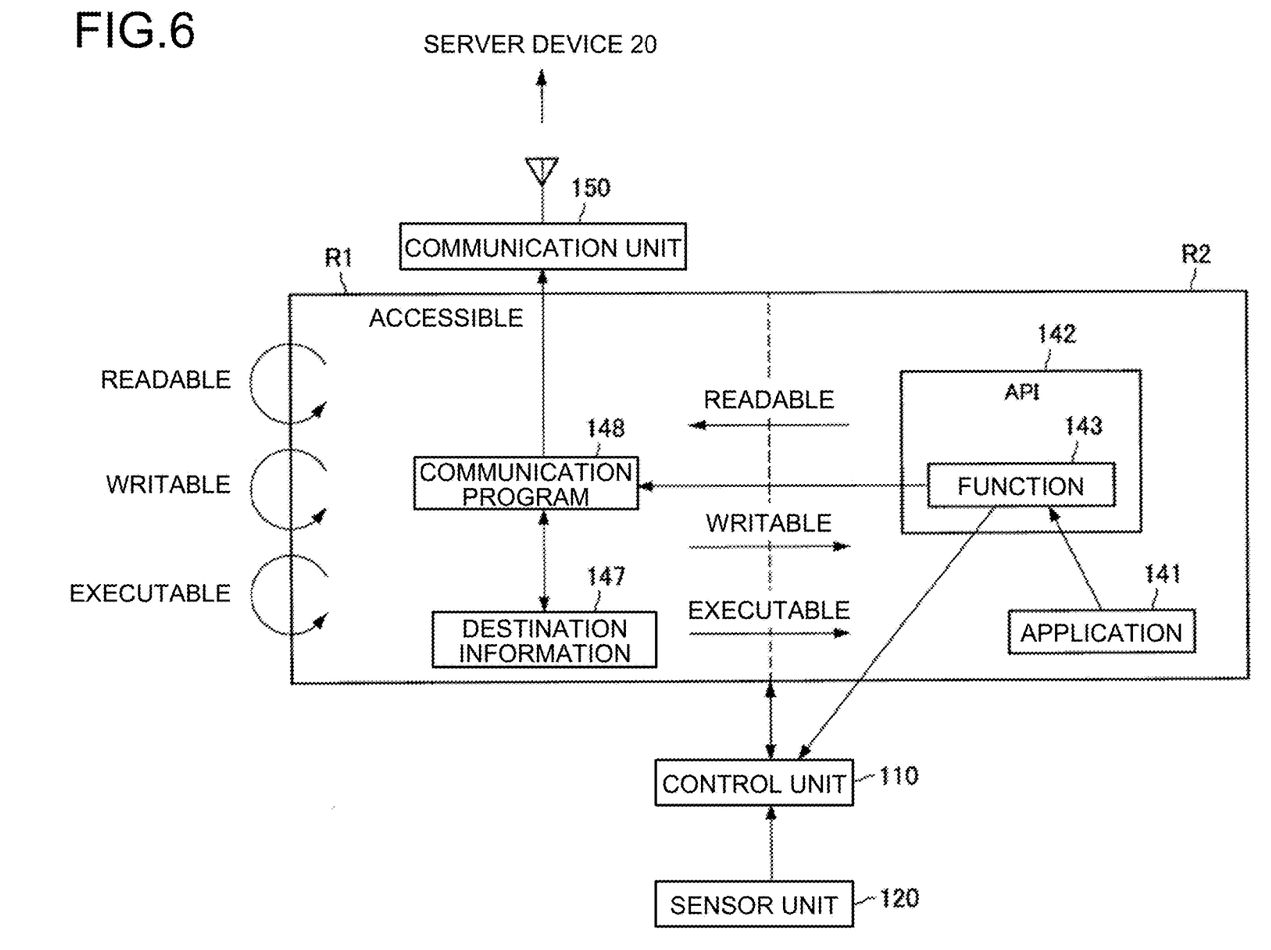
FIG. 6 is a diagram illustrating detailed functions of the communication device according to the first embodiment.

In the following, of the storage area, a first area in which reading and writing from another area are permitted only in the privileged mode is also referred to as a "secure area". Meanwhile, of the storage area, a second area in which reading and writing from another area are permitted in the privileged mode and the general mode is also referred to as a "non-secure area". FIGS. 5 to 6 are diagrams each illustrating detailed functions of the communication device 10 according to the first embodiment of the present disclosure. In FIG. 5, a secure area R1 and a non-secure area R2 in the general mode are illustrated.

As illustrated in FIG. 5, in the general mode, the control unit 110 controls a program in the non-secure area R2 so as not to perform reading from/writing to the secure area R1 and so as not to give a program execution instruction (hereinafter, also simply referred to as "execution instruction") to the secure area R1. Meanwhile, in the general mode, the control unit 110 controls a program in the non-secure area R2 to permit reading from/writing to the non-secure area R2 and to permit to give the execution instruction to the non-secure area R2.

Therefore, the control unit 110 performs control so as to prevent direct access to the communication unit 150 from the program in the non-secure area R2. Even if a malicious program enters the non-secure area R2, this configuration makes it possible to reduce the possibility of unauthorized access to the communication unit 150 from the program that has entered the non-secure area R2 and subsequent transmission of data from the communication unit 150 to a malicious address.

The secure area R1 stores a communication program 148 for controlling the transmission/reception of data by the communication unit 150. The non-secure area R2 stores an application interface (API) 142 configured to permit an application in the non-secure area R2 to indirectly perform at least one of reading from, writing to, and giving the execution instruction to the communication program 148. A function 143 configured to be called from the application is defined in the API 142. When the function 143 is called from the application in the non-secure area R2, the control unit 110 switches the operation mode from the general mode to the privileged mode. Here, it is assumed that the function 143 is a function for issuing an execution instruction for transmission of data detected by the sensor unit 120.

In FIG. 6, the secure area R1 and the non-secure area R2 in the privileged mode are illustrated. Here, when the function 143 is called from an application 141 placed in the non-secure area R2, the control unit 110 switches the operation mode from the general mode to the privileged mode, and information about transmission data and a data transmission execution instruction are passed to the communication program 148 in the secure area R1, from the application 141 in the non-secure area R2 through the function 143. This makes it possible for the communication program 148 to transmit the transmission data in the non-secure area R2 to the server device 20 via the communication unit 150.

Meanwhile, data transmitted from outside to the communication device 10 is received by the communication unit 150 and then passed to the communication program 148, and when it is determined that the data is an application program to be executed by the communication device 10 by the processing of the control unit 110, the data received by the communication unit 150 is stored in the non-secure area R2, as a new or updated application. At this time, even if a malicious program is written to the non-secure area R2 from outside and executed, direct reading, writing to, or execution of a program and data in the secure area R1 cannot be performed from the malicious program, as illustrated in FIG. 5, and thereby, unauthorized reading or rewriting can be suppressed.

For example, even if an application in the non-secure area R2 does not operate normally, if the server device 20 can detect the abnormal operation in some way, data of application that operates normally is transmitted to the communication device 10 with a command for updating the corresponding application, and thereby the reception program 148 can receive the data via the communication unit 150. Thus, the control unit 110 can restore the normal state of the application in the non-secure area R2, on the basis of the received command.

Furthermore, it is also assumed that a malicious program may invade the privileged mode (e.g., through a security hole). Even in such a case, in FIG. 6, an essential program group such as the communication program 148 is stored in a non-rewritable device or area, also suppressing the possibility of rewriting the communication program 148 stored in the secure area R1 from the malicious program that has invaded the privileged mode.

Furthermore, in order to minimize a period during which the communication device 10 is used in an unauthorized manner, not only a technology for a solution after detection of a state in which the communication device 10 is used in an unauthorized manner, but also a technology for prompt detection of a state in which the communication device 10 is being used in an unauthorized manner are essential. In an embodiment of the present disclosure, a technology capable of promptly detecting a state in which the communication device 10 is being used in an unauthorized manner and minimizing the period during which the communication device 10 is used in an unauthorized manner will be also proposed below.

Specifically, in the embodiment of the present disclosure, destination information 147 of data transmitted by the communication unit 150 is stored in the secure area R1. The destination information 147 may be represented by, for example, a Uniform Resource Locator (URL), but the representation format is not limited. Then, the communication program 148 acquires the destination information 147 in the secure area R1 and controls the communication unit 150 so as to transmit data to a destination indicated by the acquired destination information 147.

This makes it possible to transmit data transmitted from the communication unit 150 to a destination indicated by the preset destination information 147 without fail, regardless of whether the destination is specified by a program in the non-secure area R2. Therefore, even if the program in the non-secure area R2 behaves in an unauthorized manner, the destination information 147 in the secure area R1 is not read from the program in the non-secure area R2 and tampered, suppressing the possibility that the data is transmitted to a malicious destination other than the preset destination.

Furthermore, since the data transmitted from the communication unit 150 is transmitted to the server device 20 indicated by the destination information 147 without fail, and thus, analysis of data received by the server device 20 makes it possible to detect unauthorized use of the communication device 10. For example, when encrypted data is transmitted from the communication unit 150 and decrypted by the server device 20, analyzing whether the data received by the server device 20 is against encryption agreement makes it possible to detect whether the data is abnormal (whether there is unauthorized use).

In addition, as described above, it is also assumed that a malicious program may invade the privileged mode (e.g., through a security hole). Even in such a case, as described above, the destination information 147 is also stored in the non-rewritable device or area, together with the essential program group such as the communication program 148, also suppressing the possibility of rewriting the destination information 147 stored in the secure area R1.

After the processing by the communication program 148 is finished, the control unit 110 returns the operation mode to the general mode, finishes the process of the function 143, and returns the processing to the program in the non-secure area R2.

The detailed functions of the communication device 10 according to the first embodiment of the present disclosure have been described above.

2. SECOND EMBODIMENT

Subsequently, a second embodiment of the present disclosure will be described.

<2.1. System Configuration Example>

Figure 7:
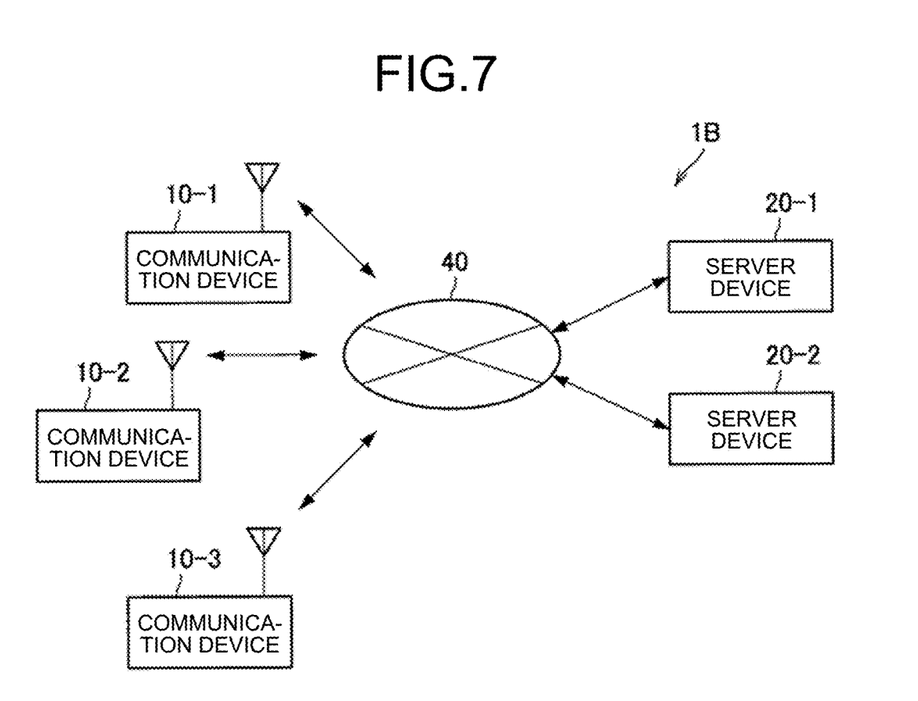
FIG. 7 is a diagram illustrating a configuration example of a communication system according to a second embodiment of the present disclosure.

A configuration example of a communication system according to the second embodiment of the present disclosure will be described with reference to FIG. 7. FIG. 7 is a diagram illustrating the configuration example of the communication system according to the second embodiment of the present disclosure. As illustrated in FIG. 7, a communication system 1B according to the second embodiment of the present disclosure includes a plurality of server devices 20, unlike the communication system 1A according to the first embodiment of the present disclosure. In the example illustrated in FIG. 7, the number of the server devices 20 is two (the communication system 1B includes a server device 20-1 and a server device 20-2), but the number of the server devices 20 is not limited, as long as the number of the server devices 20 is two or more.

The configuration example of the communication system 1B according to the second embodiment of the present disclosure has been described above.

<2.2. Detailed Functions of Communication Device>

Next, detailed functions of a communication device 10 according to the second embodiment of the present disclosure will be described. As described with reference to FIG. 7, the communication system 1B according to the second embodiment of the present disclosure includes the plurality of server devices 20 (i.e., there are a plurality of candidates for data transmission destinations). In the second embodiment of the present disclosure, a plurality of pieces of destination information 147 are stored in the secure area R1, and the application 141 specifies whether which of the plurality of pieces of destination information 147 is to be used. This makes it possible to suppress the possibility of transmission of data to a malicious destination other than a preset destination, as in the first embodiment of the present disclosure.

Figure 8:
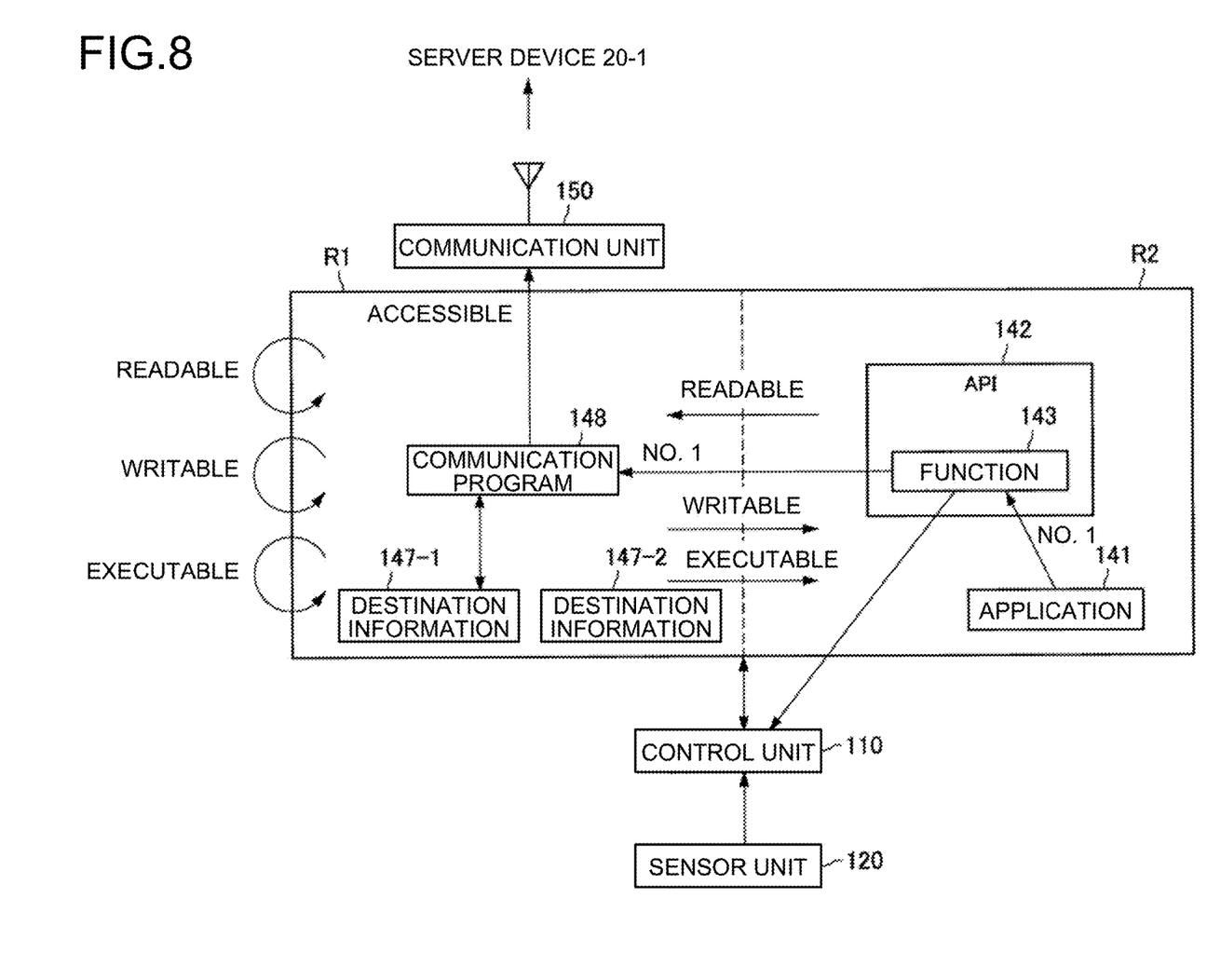
FIG. 8 is a diagram illustrating detailed functions of a communication device according to the second embodiment.
Figure 9:
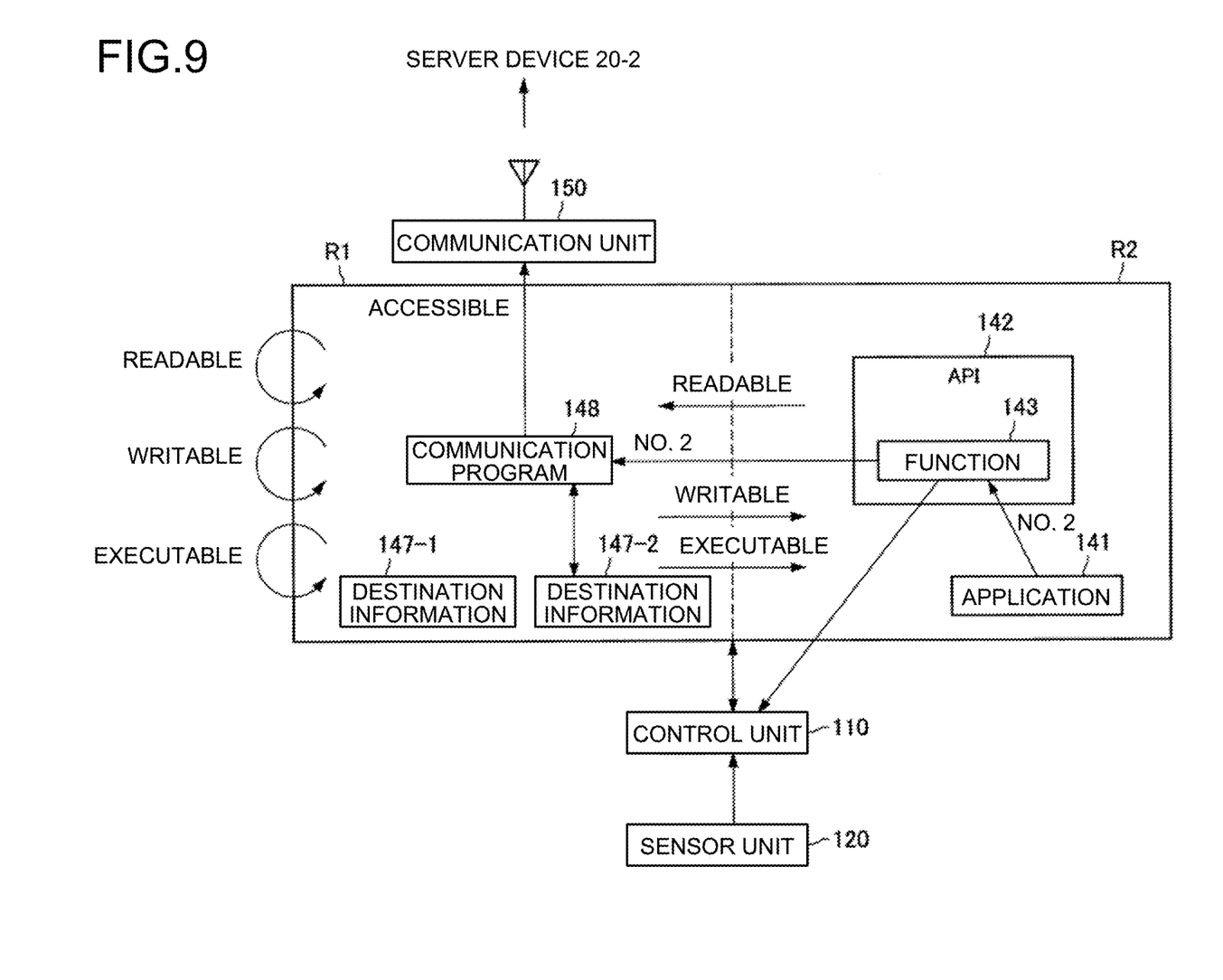
FIG. 9 is a diagram illustrating detailed functions of the communication device according to the second embodiment.

FIGS. 8 and 9 are diagrams each illustrating detailed functions of the communication device 10 according to the second embodiment of the present disclosure. In FIG. 8, the secure area R1 and the non-secure area R2 in the privileged mode are illustrated. In the second embodiment of the present disclosure as well, the application 141 placed in the non-secure area R2 calls the function 143 defined in the API 142, and thereby information about transmission data and a data transmission execution instruction are passed to the communication program 148 in the secure area R1, as in the first embodiment At this time, when the application 141 desires to specify the server device 20-1 as the destination, the application 141 preferably specifies destination information 147-1 that corresponds to the server device 20-1 (in the example illustrated in FIG. 8, "No. 1" is specified). Information specifying the destination information 147-1 may be given in any way, but for an example, the information is preferably given as an argument when the function 143 is called. When the destination information 147-1 is specified, the communication program 148 transmits data to the server device 20-1 via the communication unit 150, on the basis of the specified destination information 147-1.

Meanwhile, in FIG. 9, the secure area R1 and the non-secure area R2 in the privileged mode are illustrated, as in the example illustrated in FIG. 8. However, here, it is assumed that the application 141 desires to specify the server device 20-2 as the destination. In such a case, the application 141 preferably specifies destination information 147-2 that corresponds to the server device 20-2 (in the example illustrated in FIG. 9, "No. 2" is specified). When the destination information 147-2 is specified, the communication program 148 transmits data to the server device 20-2 via the communication unit 150, on the basis of the specified destination information 147-2.

Note that FIGS. 8 and 9 each illustrate an example in which one destination information 147 is specified by the application 141 in the non-secure area R2. However, a plurality of pieces of destination information 147 may be specified by the application 141 in the non-secure area R2.

At this time, data is preferably transmitted by the communication program to the plurality of server devices 20 that correspond to the plurality of pieces of destination information 147. Furthermore, when destination information 147 is specified by a program in the secure area R1, data may be transmitted by the communication program to a server device 20 that corresponds to the destination information 147, as in the case in which destination information 147 is specified by an application in the non-secure area R2.

The detailed functions of the communication device 10 according to the second embodiment of the present disclosure have been described above.

3. EXEMPLARY HARDWARE CONFIGURATION

Figure 10:
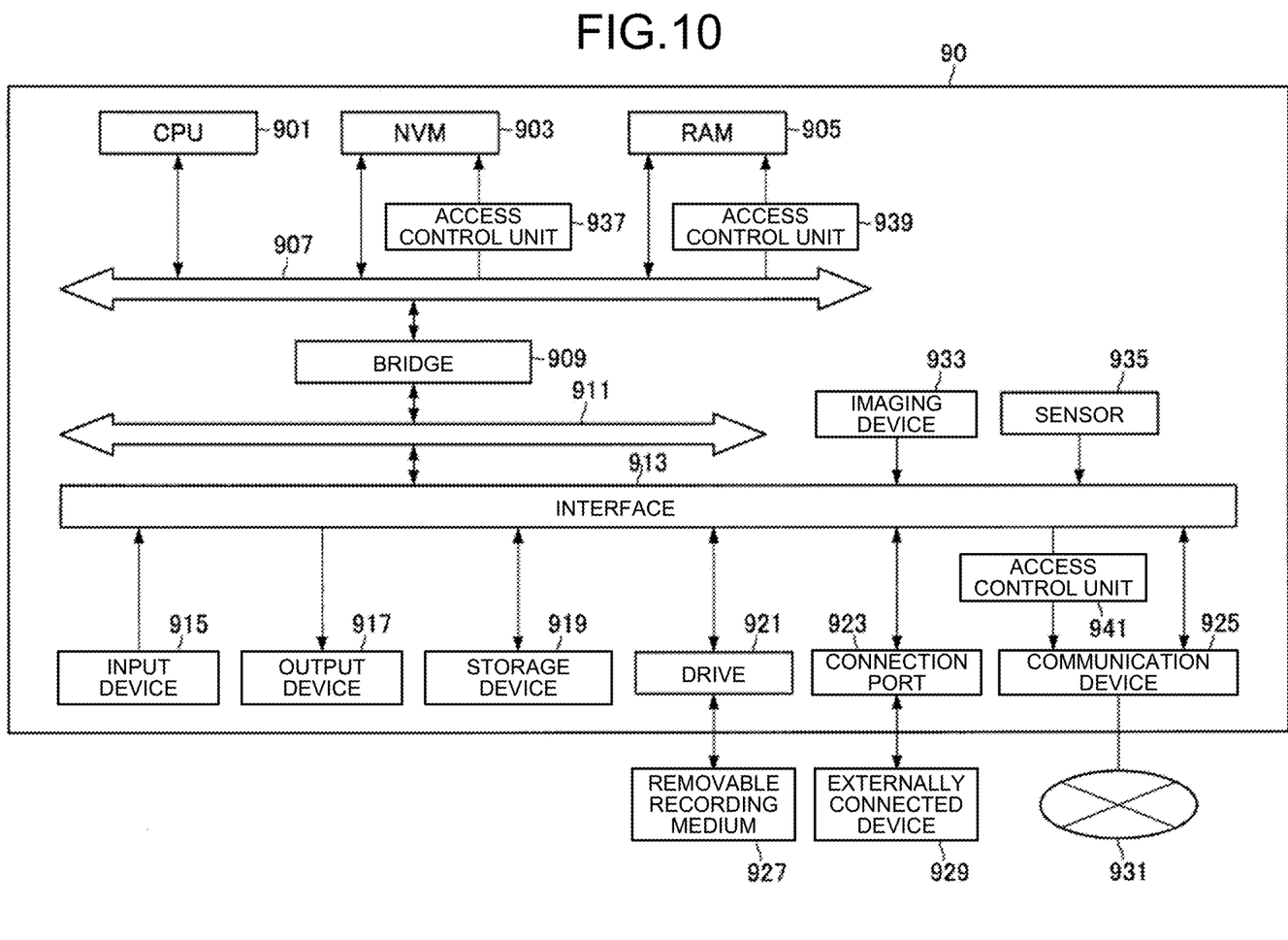
FIG. 10 is a diagram illustrating an exemplary hardware configuration of a computer as an exemplary hardware configuration of a communication device according to an embodiment of the present disclosure.

Next, an exemplary hardware configuration of a computer 90 will be described, as an exemplary hardware configuration of a communication device 10, according to an embodiment of the present disclosure with reference to FIG. 10. FIG. 10 is a block diagram illustrating an exemplary hardware configuration of the computer 90. Note that the hardware configuration of the communication device 10 does not need to completely match the exemplary hardware configuration illustrated in FIG. 10 (e.g., an unnecessary configuration may be removed from the exemplary hardware configuration illustrated in FIG. 10).

As illustrated in FIG. 10, the computer 90 includes a central processing unit (CPU) 901, a nonvolatile memory (NVM) 903, and a random access memory (RAM) 905. In the NVM 903, a writable area and a non-writable area can be set in advance. Furthermore, the computer 90 includes a host bus 907, a bridge 909, an external bus 911, an interface 913, an input device 915, an output device 917, a storage device 919, a drive 921, a connection port 923, and a communication device 925. Furthermore, the computer 90 includes an imaging device 933 and a sensor 935. The computer 90 further includes an access control unit 937, an access control unit 939, and an access control unit 941. The computer 90 may include a processing circuit called a digital signal processor (DSP) or application specific integrated circuit (ASIC) in place of or in combination with the CPU 901.

The CPU 901 functions as an arithmetic processing unit and a control device, and controls all or part of the operation in the computer 90, according to various programs recorded in the NVM 903, the RAM 905, the storage device 919, or a removable recording medium 927. The NVM 903 stores programs or calculation parameters used by the CPU 901. The RAM 905 temporarily stores programs used in execution of the CPU 901 or parameters or the like that change appropriately in the execution of the programs. The CPU 901, NVM 903, and RAM 905 are connected to each other by the host bus 907 including an internal bus such as a CPU bus. An area or device inaccessible by the access control unit 937, the access control unit 939, and the access control unit 941 can be set in advance. Furthermore, the host bus 907 is connected to the external bus 911 such as a peripheral component interconnect/interface (PCI) bus via the bridge 909.

The input device 915 is a device configured to be operated by the user, such as a mouse, keyboard, touch panel, button, switch, or lever. The input device 915 may include a microphone configured to detect user's voice. The input device 915 includes an input control circuit configured to generate an input signal on the basis of information input by the user and output the input signal to the CPU 901. The user operates the input device 915 to input various data to the computer 90 or give an instruction for processing operation. Furthermore, the imaging device 933, which is described later, also functions as an input device by imaging the movement of a user's hand, user's finger, or the like. At this time, a pointing position may be determined according to the movement of the hand or direction of the finger.

The output device 917 includes a device configured to visually or audibly notify the user of information acquired. The output device 917 may be, for example, a display device such as a liquid crystal display (LCD), plasma display panel (PDP), organic electro-luminescence (EL) display, or projector, a hologram display device, a sound output device such as a speaker or headphone, a printer device, or the like. The output device 917 outputs a result of processing by the computer 90, as an image such as a text or video, or as sound or audio sound. Furthermore, the output device 917 may include a light or the like configured to illuminate the surroundings.

The storage device 919 is a data storage device configured as an example of a storage unit of the computer 90. The storage device 919 includes, for example, a magnetic storage device such as a hard disk drive (HDD), a semiconductor storage device, an optical storage device, a magneto-optical storage device, or the like. The storage device 919 is also configured to store programs executed by the CPU 901, various data, various data acquired from outside, and the like.

The drive 921 is a reader/writer for the removable recording medium 927 such as a magnetic disk, optical disk, magneto-optical disk, or semiconductor memory, and is built in or externally mounted to the computer 90. The drive 921 reads information recorded in the removable recording medium 927 mounted and outputs the information to the RAM 905. In addition, the drive 921 writes a record in the removable recording medium 927 mounted.

The connection port 923 is a port configured to directly connect a device to the computer 90. The connection port 923 may be, for example, a universal serial bus (USB) port, an IEEE1394 port, a small computer system interface (SCSI) port, or the like. Furthermore, the connection port 923 may be an RS-232C port, an optical audio terminal, a high-definition multimedia interface (HDMI) (registered trademark) port, or the like. Connecting an externally connected device 929 to the connection port 923 makes it possible to exchange various data between the computer 90 and the externally connected device 929.

The communication device 925 is a communication interface including, for example, a communication device or the like for connecting to a communication network 931. The communication device 925 may be, for example, a modem that is configured to be connected to a wireless communication network for mobile communication, such as cellular communication, or may be a wired or wireless local area network (LAN), Bluetooth (registered trademark), or a communication card for a wireless USB (WUSB). Furthermore, the communication device 925 may be a router for optical communication, a router for an asymmetric digital subscriber line (ADSL), a modem for various communications, or the like. The communication device 925, for example, transmits/receives signals and the like to and from the Internet or another communication device by using a predetermined protocol such as TCP/IP. Furthermore, the communication network 931 connected to the communication device 925 is a network connected in a wired or wireless manner, and is, for example, the Internet, a home LAN, infrared communication, radio wave communication, or satellite communication.

The imaging device 933 is a device that uses, for example, an imaging element such as a charge coupled device (CCD)

or complementary metal oxide semiconductor (CMOS), and various members such as a lens for controlling formation of an object image on an imaging element to image a real space and generates a captured image. The imaging device 933 may be a device that captures a still image or a device that captures a moving image.

The sensor 935 is, for example, various sensors such as a distance measuring sensor, acceleration sensor, gyro sensor, geomagnetic sensor, optical sensor, or sound sensor. The sensor 935 acquires, for example, information about a state of the computer 90 itself such as a posture of a housing of the computer 90, or information about the surrounding environment of the computer 90 such as the brightness, noise, or the like around the computer 90. The sensor 935 may also include a GPS sensor configured to receive a global positioning system (GPS) signal to measure the latitude, longitude, and altitude of the device.

The exemplary hardware configuration of the communication device 10 according to the embodiment of the present disclosure has been described above.

4. CONCLUSION

As described above, according to the present embodiment, a communication device is provided that includes a communication unit configured to transmit/receive data, and a storage unit that includes a first area and a second area different from the first area, and in the communication device, the first area is an area in which reading and writing from a program in the second area is prohibited, and the first area stores both of a communication program configured to control the transmission/reception and destination information of the data. Such a configuration makes it possible to suppress the possibility of unauthorized use of an electronic device.

Preferred embodiments of the present disclosure have been described in detail with reference to the accompanying drawings, but the technical scope of the present disclosure is not limited to these examples. A person skilled in the art may obviously find various alternations and modifications within the technical concept described in claims, and it should be understood that they will naturally come under the technical scope of the present disclosure.

In addition, the effects described herein are merely illustrative and demonstrative and are not limitative. In other words, the technology according to the present disclosure can exhibit, along with or instead of the effects, other effects apparent to those skilled in the art from the description herein.

Note that, the following configurations also belong to the technical scope of the present disclosure.

(1)
A communication device comprising:
a communication unit configured to transmit/receive data; and
a storage unit that includes a first area and a second area different from the first area,
wherein the first area is an area in which reading and writing from a program in the second area is prohibited, and
the first area stores both of a communication program configured to control the transmission/reception and destination information of the data.

(2)
The communication device according to (1), wherein in the communication unit, access from a program in the second area is prohibited.

(3)
The communication device according to (1) or (2), wherein
the communication program
is stored in the first area where writing from a program in the first area is also prohibited.

(4)
The communication device according to any one of (1) to (3), wherein
the destination information
is stored in the first area where writing from a program in the first area is also prohibited.

(5)
The communication device according to any one of (1) to (4), wherein
the first area stores a plurality of pieces of the destination information, and
when one or more pieces of destination information is specified from the plurality of pieces of the destination information by a program in the first area or a program in the second area, the data is transmitted based on the one or more pieces of destination information.

(6)
The communication device according to any one of (1) to (5), wherein
a program in the second area is configured to call a function for issuing an execution instruction to the communication program, and
the function switches an operation mode to a mode in which reading and writing in the first area from the program in the second area are permitted, based on the execution instruction given to the communication program.

(7)
The communication device according to (6), wherein
after processing by the communication program is finished, the function returns the operation mode to a mode in which reading and writing in the first area from the program in the second area are prohibited, and returns the processing to the program in the second area.

REFERENCE SIGNS LIST 1A, 1B COMMUNICATION SYSTEM
10 COMMUNICATION DEVICE
110 CONTROL UNIT
120 SENSOR UNIT
140 STORAGE UNIT
141 APPLICATION
142 API
143 FUNCTION
147 DESTINATION INFORMATION
148 COMMUNICATION PROGRAM
150 COMMUNICATION UNIT
20 SERVER DEVICE
210 CONTROL UNIT
240 STORAGE UNIT
250 COMMUNICATION UNIT
40 NETWORK
R1 SECURE AREA
R2 NON-SECURE AREA

The invention claimed is:
1. A communication device comprising:
a communication circuitry configured to transmit/receive data; and
a computer-readable storage that includes a first storage area and a second storage area different from the first storage area,
wherein the first storage area is an area in which reading and writing from a first program in the second storage area is prohibited, wherein the first storage area stores both of a communication program to control transmission/reception of the data by the communication circuitry and destination information of the data, wherein the first program in the second storage area is to call a function to issue an execution instruction to the communication program, and wherein the function switches an operation mode to a first mode in which reading and writing in the first storage area from the first program in the second storage area are permitted, based on the execution instruction given to the communication program.

2. The communication device according to claim 1, wherein in the communication transceiver, access from the first program in the second storage area is prohibited.

3. The communication device according to claim 1, wherein the communication program is stored in the first storage area where writing from a second program in the first storage area is also prohibited, the second program being different from the first program.

4. The communication device according to claim 1, wherein the destination information is stored in the first storage area where writing from a second program in the first storage area is also prohibited, the second program being different from the first program.

5. The communication device according to claim 1,
wherein the first storage area stores a plurality of pieces of the destination information, and
wherein when one or more pieces of the plurality of pieces of the destination information is specified by a second program in the first storage area or the first program in the second storage area, the data is transmitted based on the one or more pieces of the plurality of pieces of the destination information.

6. The communication device according to claim 1, wherein after processing by the communication program is finished, the function returns the operation mode to a second mode in which reading and writing in the first storage area from the program in the second storage area are prohibited, and returns the processing to the program in the second storage area.

7. A communication system comprising:
a communication circuitry configured to transmit/receive data; and
a computer-readable storage that includes a first storage area and a second storage area different from the first storage area,
wherein the first storage area is an area in which reading and writing from a first program in the second storage area is prohibited,
wherein the first storage area stores a communication program to control transmission/reception of the data by the communication circuitry,
wherein the first program in the second storage area is to call a function to issue an execution instruction to the communication program, and
wherein the function switches an operation mode to a first mode in which reading and writing in the first storage area from the first program in the second storage area are permitted, based on the execution instruction given to the communication program.

8. The communication system according to claim 7, wherein in the communication transceiver, access from the first program in the second storage area is prohibited.

9. The communication system according to claim 7, wherein the communication program is stored in the first storage area where writing from a second program in the first storage area is also prohibited, the second program being different from the first program.

10. The communication system according to claim 7,
wherein the first storage area stores both of the communication program to control transmission/reception of the data by the communication circuitry and destination information of the data, and
wherein the destination information is stored in the first storage area where writing from a second program in the first storage area is also prohibited, the second program being different from the first program.

11. The communication system according to claim 10,
wherein the first storage area stores a plurality of pieces of the destination information, and
wherein when one or more pieces of the plurality of pieces of the destination information is specified by the second program in the first storage area or the first program in the second storage area, the data is transmitted based on the one or more pieces of the plurality of pieces of the destination information.

12. The communication system according to claim 7, wherein after processing by the communication program is finished, the function returns the operation mode to a second mode in which reading and writing in the first storage area from the program in the second storage area are prohibited, and returns the processing to the program in the second storage area.

13. A communication method comprising:
calling a function, using a first program in a second area of computer-readable memory, to issue an execution instruction to a communication program that controls transmission/reception of data by communication circuitry of a communication device; and
responsive to said calling the function, switching an operation mode to a first mode in which reading and writing in a first area of the computer-readable memory from the first program in the second area are permitted, based on the execution instruction given to the communication program,
wherein the communication program is stored in the first area of the computer-readable memory,
wherein said switching the operation mode to the first mode is from a second mode in which, regarding the first area, reading and writing from the first program in the second area is prohibited.

14. The communication method according to claim 13, wherein the first area of the computer-readable memory stores destination information of the data.

* * * * *